United States Patent Office 3,219,644
Patented Nov. 23, 1965

3,219,644
VINYL KETO POLYMERS AND METHOD OF MAKING SAME
Frederick C. Leavitt, Framingham, Mass., assignor to The Dow Chemical Company, Midland, Mich., a corporation of Delaware
No Drawing. Filed May 31, 1962, Ser. No. 198,709
23 Claims. (Cl. 260—93.5)

This invention relates to vinyl keto polymers and the preparation thereof. More specifically, it relates to a method of preparing such polymers by the acylation of alkenyl aromatic polymers with a β-chloropropionyl halide, or related compounds, and subsequently dehydrohalogenating the resultant acyl derivative to produce the corresponding vinyl keto group.

Polymers of alkenyl aromatic compounds having residual vinyl groups pendant to the aromatic nuclei therein are desirable for many purposes, including post-reactions either to attach various functional derivative groups or to effect a delayed crosslinking after the linear polymer has been shaped or otherwise processed. Preparation of such compositions by the polymerization of monomers having two vinyl groups therein generally results in the second vinyl group also participating in the polymerization reaction so as to give crosslinked polymers which are not amenable to shaping and various other post-treatments.

For example, attempts to prepare polymers having such pendant vinyl groups by the preparation and polymerization of acrylyl styrene have proved unsuccessful. In such a monomer, both of the vinyl groups have a very strong tendency to polymerize. Therefore, attempts to form a linear polymer by polymerizing one of the two types of polymerizable groups therein have resulted in sufficient crosslinking by simultaneous polymerization of the other type of vinyl group to defeat the desired objective. As a result it has been impossible by such a method to prepare linear polymers or noncrosslinked polymers of acrylyl styrene from such a monomer.

In accordance with the present invention, it has now been found possible to prepare linear polymers or noncrosslinked polymers of alkenyl aromatic polymers having pendant vinyl keto groups, such as acrylyl groups, extending from the aromatic nuclei therein. Moreover, it has been found possible by this invention to introduce such pendant groups up to a molar ratio of 0.5 vinyl keto group per aromatic nucleus contained in the polymer. In other words, it is possible to introduce as many as 50% vinyl keto groups on a molar basis on the aromatic nuclei contained in the preformed polymer. This has been found possible by acylating a preformed linear polymer of an alkenyl aromatic compound with an acyl halide of the formula

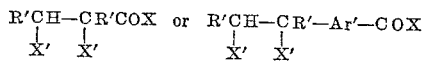

wherein at least on X' is Cl, Br or I, and the other X' is hydrogen; X is a halogen, e.g. Cl, Br, I or F; at least one R' is hydrogen and the other is hydrogen or a methyl, phenyl, cyano or chloro radical, and Ar' is a divalent phenyl or naphthyl radical.

As used herein, the term "vinyl keto group" is intended to represent groupse having one of the formulas:

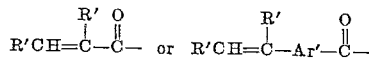

wherein R' and Ar' represent the same groups as defined above.

In the above compounds it has been found that the conjugation effect present in the vinyl keto groups of the acrylyl type radical due to the juxtaposition of the vinyl and the keto groups is also present in the compounds of the second formula in which an aromatic nucleus is interposed between the keto group and the vinyl group. The conjugation of the aromatic nucleus has the same effect.

It has been found possible by the practice of this invention to introduce a substantial number of vinyl keto groups, e.g., up to 50% on a molar basis based on the number of aromatic nuclei present in the preformed polymer. While ultimate improvements of the product are noted with as little as .01% molar substitution on the basis of the aromatic nuclei in the original polymer, it is generally preferred to have at least 5% vinyl keto substitution.

The acrylyl group is the preferred group to be attached ultimately to the polymer in accordance with this invention, and therefore, halogenated acyl halides which can eventually be dehydrohalogenated to give the acrylyl group are preferred in the practice of this invention. However, other acyl halides having one of the above-indicated formulas can also be used with the improved results described herein.

While it might be expected that a certain amount of alkylation would be effected through the halogen in the α or β positions of the acylating agent in the presence of AlCl₃, it has been found that, due to the greater reactivity of the acyl halide, it is possible to selectively acylate without simultaneously effecting any substantial amount of alkylation through the α or β halogen. This side reaction is also minimized or avoided completely by using relatively dilute solutions of the alkenyl aromatic polymer. It is generally preferred to use solutions or suspensions containing no more than about 40% of polymer based on the combined weight of polymer and solvent or suspension medium. This side reaction is further minimized by operating at temperatures in the range of 0 to 80° C. Preferred temperatures are approximately room temperature and ambient temperatures.

Where the higher temperatures are used, it is generally advantageous to favor minimizing the alkylation side reaction by avoiding the use of excessive amounts of AlCl₃. Where the preferred range of temperatures or even lower temperatures are used, the proportion of AlCl₃ can be as much as 1.5 moles per mole of acylating agent. With the higher temperatures, it is advantageous to use approximately 1 mole of AlCl₃ per mole of acylating agent. In instances where such reaction is found to occur, this can be avoided by using a greater amount of acylating agent than actually desired to be attached to the polymer, and then using a molar proportion of AlCl₃ which will correspond to the desired degree of substitution. In this way, if any additional reaction occurs, it is in the manner of a greater degree of mono-substitution than in a double reaction of the same molecule of acylating agent.

Since yields of 90% of theoretical of the acylation group are generally effected based on the amount of acylating agent used, it is possible to calculate the amount of acylating agent to use for obtaining the desired degree of substitution without any undesired side alkylation. The proportion of acylating agent to be used depends on the degree of substitution desired in the resultant polymeric product.

Obviously, however, if less than a mole per mole basis of AlCl₃ is used, the degree of acylation effected will be decreased accordingly. While acylation can be effected in corresponding amount with as little as 0.1 mole of AlCl₃ per mole of acylating agent, it is generally preferred to use mole per mole or even a slight excess of AlCl₃.

Based on the proportion of vinyl keto groups in the ultimate product, improvements are noted with as little as .01% substitution. Generally, however, about 5–30% substitution of vinyl keto groups on the basis of aromatic nuclei is preferred, although it is possible, and in some cases, desirable to go as high as 50% substitution. However, where substitutions above 30% are to be effected, it is advantageous to employ temperatures no greater than about 65° C. to avoid crosslinking through the vinyl keto groups. With a degree of substitution no greater than 30%, temperatures as high as 120° C. can be used during the dehydrohalogenation. Moreover, it is generally desirable to avoid use of real strong bases, since these also induce polymerization.

As indicated above, the degree of substitution is defined as the number of acyl groups substituted per 100 aromatic nuclei. Where the aromatic component of a copolymer represents a minor proportion of the total copolymer, the aromatic nuclei acylated can be much greater on a per molar percentage basis. On a weight basis, the proportion of vinyl keto groups and the resultant polymer generally advantageously does not exceed about 25% on the basis of the weight of the entire polymer, depending somewhat on the relative weights of the acyl group and the repeating units of the starting polymer.

Polystyrene is preferred in the practice of this invention, but other polymers of alkenyl aromatic compounds can be used, preferably those in which the aromatic ring has no substitution or a small amount of substitution, in addition to the alkenyl group. Other substituents on the aromatic ring can include, but are not limited to, various aliphatic, cycloaliphatic and aromatic hydrocarbon groups, preferably of no more than about 8 carbon atoms, halogen, e.g. Cl, F, Br and I, etc.

Typical alkenyl aromatic compounds that can be used include, but are not restricted to, polymers of the following: styrene, alphamethylstyrene, alphaethylstyrene, various derivatives of styrene having the substituent groups attached to the aromatic nucleus, such as, methyl styrene, ethyl styrene, propyl styrene, butyl styrene, heptyl styrene, octyl styrene, cyclohexyl styrene, cyclopentyl styrene, and the corresponding derivatives of alphamethylstyrene, alphaethylstyrene, etc., chloro styrene, cyanomethyl styrene, etc., preferably with the nuclear substituent group of the preceding compounds in a position other than para to the alkenyl group, vinyl naphthalene, isopropenyl naphthalene, vinyl methyl naphthalene, vinyl ethyl naphthalene, vinyl dimethyl naphthalene, vinyl hexyl naphthalene, vinyl diethyl naphthalene, isopropenyl diphenyl, vinyl methyl diphenyl, vinyl butyl diphenyl, vinyl chloro naphthalene, vinyl cyano naphthalene, vinyl cyanoethyl naphthalene, isopropenyl bromo naphthalene, vinyl chloro diphenyl, isopropenyl cyano diphenyl, isopropenyl fluoro diphenyl, etc.

As indicated above, various copolymers of alkenyl aromatic compounds are also included for use in the practice of this invention. In such cases it is desirable to have at least 5% of the alkenyl aromatic monomer contained in the copolymer so as to provide sufficient aromatic nuclei which can be acylated to provide a desired amount of crosslinking groups, preferably at least 20%, particularly where the comonomer may have substituents therein which retard or interfere with the acylation. In some cases it may be desirable to use copolymers of one alkenyl aromatic group having no substituents or no more than one substituent on the aromatic nucleus, and as the comonomer an alkenyl aromatic monomer having a high degree of substitution thereon, in which case the latter monomer does not have positions easily available for acylation. In such case it is desirable to use copolymers of monomer mixtures having at least 5% of the unsubstituted or substituted alkenyl aromatic compound having one substituent group other than the alkenyl group.

Generally, however, it is preferred to use at least 20% of an alkenyl aromatic compound having a number of positions available for acylation even though it is not intended, or possibly desired, to substitute an acyl group on each of such nuclei.

In addition to various alkenyl aromatic compounds having a high degree of substitution thereon of the groups indicated above, it is also desirable in many cases to use other modifying comonomers in conjunction with the unsubstituted or monosubstituted alkenyl aromatic compounds. Preferred comonomers are those which are not reactive with or reacted on by the $AlCl_3$. Typical preferred comonomers, in addition to the various alkenyl aryl compounds listed above are ethylene, propylene, butenes, butadiene, isoprene, vinyl ethyl ether, acrylonitrile, methyl methacrylate, etc.

Advantageously, the polymers used as starting materials in the practice of this invention are solid at room temperature. Molecular weights of no less than 3000 are generally preferred, although in some cases where a high degree of acylation is to be effected with the result that the molecular weight will be multiplied considerably upon crosslinking, even a lower molecular weight can often be used. There is no upper limit on the molecular weight of the polymers that can be used. With higher molecular weights such as 150,000 or higher, the number of acyl groups to be introduced to produce insolubility and infusibility upon crosslinking, is obviously much smaller than is the case where lower molecular weight polymers are used.

Since the polymers starting material is generally a solid, it is desirable to use a solvent to provide more intimate contact between the reagents, and also to provide a medium which will retain the by-products or unreacted reagents after the polymer product is precipitated therefrom. Obviously, the solvent selected is one which is non-reactive with the $AlCl_3$. Typical solvents suitable for this purpose are methylene chloride, ethylene chloride, chlorobenzene, carbon disulfide, nitrobenzene, etc.

While it is generally preferred to have a linear, soluble polymer as the preformed starting polymer, it is also desirable in some cases to apply the present invention to crosslinked, insoluble polymers where it is desired to effect the substitution of vinyl keto groups on a limited portion of the starting polymer. For example, beads, pellets, and particles of such crosslinked, insoluble polymers, can be suspended in one of the solvents indicated above and the acylation and dehydrohalogenation reactions effected on the surface of the beads, pellets, particles or other shape of the starting polymer. In such cases, it is generally helpful to have a swelling of the polymer by absorption of a solvent. Typical crosslinked insoluble polymers which can be used for this purpose are those polymers of alkenyl aromatic compounds as listed above, which have been copolymerized with minor amounts of difunctional monomers such as divinyl benzene, divinyl toluene, divinyl naphthalene, divinyl diphenyl, diisopropenyl benzene, ethylene glycol diacrylate, divinyl phthalate, etc.

The dehydrohalogenation is promoted by the use of any appropriate hydrogen halide acceptor. Generally, the strong alkalis are not desirable since they promote polymerization of the ultimate vinyl keto groups, particularly when higher temperatures are used in this reaction. Typical alkaline materials which are preferred as hydrogen halide acceptors in the practice of this invention include, but are not restricted to: alkali and alkaline earth metal salts of carboxylic acids, such as sodium acetate, potassium acetate, sodium propionate, sodium benzoate, lithium benzoate, lithium propionate, sodium hexoate, calcium benzoate, calcium acetate, barium acetate, etc.; the alkali and alkaline earth metal salts of weak inorganic acids, such as sodium borate, sodium phosphate, potassium borate, calcium borate, sodium bicarbonate, potassium bicarbonate, sodium carbonate, etc.; and the tertiary amines, such as trimethyl amine, triethyl amine, pyridine, tribenzyl amine, dimethylbenzyl amine, dimethyl aniline, etc.

It is generally desirable to have excess of such base present in order to absorb the hydrogen halide quickly and completely. The dehydrogenation reaction is generally easily effected for substantially complete removal of the halogen atom which is split out in the formation of the double bond. However, when a vinyl group is formed which still has a chlorine atom attached thereto, this remaining chlorine atom is not disturbed since it is difficult to remove a chlorine from a vinyl group.

In conducting the dehydrohalogenation reaction, the rate of reaction increases with the temperature. However, as explained above, it is desirable to avoid the use of exceedingly high temperatures so as to avoid the possibility of polymerization through the vinyl group, particularly with more active groups, such as the acrylyl group. Generally, however, temperatures as high as 65° C. can be used without any such difficulties.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

EXAMPLE I

To a reactor equipped with a stirrer, a solution of two parts of a polystyrene resin in 100 parts of carbon disulfide is added. The polystyrene resin has a low molecular weight as evidenced by an absolute viscosity of two centipoises determined on a 10% by weight solution in toluene at 25° C. To this resin-carbon disulfide solution is added 0.31 part of β-chloro-propionyl chloride. Then 0.5 part of anhydrous AlCl$_3$ is added slowly at 5° C. The resultant mixture is stirred, warmed slowly to 35° C. and kept at 35° C. for 1.5 hours. The reaction mixture is then poured onto a dilute HCl-ice mixture having a combined volume of approximately three times that of the reaction mixture and having sufficient ice therein to occupy approximately the same volume as the dilute acid. The polymer precipitated thereby is redissolved in acetone and reprecipitated by adding this solution to methanol. Analysis shows that the purified polymer has 4.6 β-chloroethyl keto groups for every 100 styrene nuclei.

The above polymer is then dissolved in a solvent consisting of two parts by volume of tetrahydrofurane and one part isopropyl alcohol to produce a 1% solution. Potassium acetate is added in an amount to provide 2 moles of potassium acetate per chlorine atom contained in the polymer. The resultant mixture is heated at 60° C. for 2.5 hours. Then the polymer is precipitated and purified by reprecipitation. Analysis shows that the final chlorine content is negligible, whereas the intermediate polymer contained 2% chlorine. Analysis shows a degree of substitution of vinyl keto groups (hereinafter sometimes referred to as D.S.) of approximately 4.6, e.g. 4.6 vinyl keto groups per 100 aromatic nuclei present in the polymer. Upon heating, this product, the polymer becomes crosslinked with accompanying increasing insolubility and increased melting point until the material becomes sufficiently crosslinked to produce infusibility.

EXAMPLE II

The procedure of Example I is repeated using in place of the polystyrene used in Example I, a polystyrene of high molecular weight as evidenced by an absolute viscosity of 25 determined on a 10% by weight solution in toluene at 15° C. Similar results are obtained except that the ultimate product is insoluble and infusible upon a much shorter heating period.

EXAMPLE III

The procedure of Example I is repeated using 10 times the amount of β-chloro-propionyl chloride with the result that the intermediate polymer and ultimate polymer have approximately 44% derivative groups of the types indicated substituted on the intermediate and ultimate polymer products respectively. The ultimate product becomes crosslinked to an insoluble and infusible state with a much shorter heating period than is necessary with the product of Example I.

EXAMPLE IV

The procedure of Example II is repeated a number of times using similar amounts of polymers of approximately similar molecular weights of vinyl toluene, α-methyl styrene, o-Cl-styrene, vinyl naphthalene, and vinyl diphenyl respectively. Similar results are obtained, and upon heating the resultant polymers effective crosslinking results.

EXAMPLE V

The procedure of Example II is repeated four times with similar results using a different solvent each time in place of the carbon disulfide, namely methylene chloride, ethylene chloride, chlorobenzene and nitrobenzene respectively.

EXAMPLE VI

The procedure of Example II is repeated twelve times using individually 10% solutions of the various polymers indicated in Table A, each dissolved in methylene chloride, and using the respective acylating agents shown, together with 3.4 parts of anhydrous AlCl$_3$. In each case, the vinyl keto groups indicated are produced upon the dehydrohalogenation with the various dehydrohalogenating agents indicated. Satisfactory crosslinking is effected in each case upon heating the ultimate polymer.

*Table A*

| Polymer | | Acylating agent | | Dehydrohalogenating agent | | Resultant vinyl keto group |
| --- | --- | --- | --- | --- | --- | --- |
| Type | Parts | Type | Parts | Type | Parts | |
| Polystyrene | 10 | β-Cl-propionyl chloride | 3.2 | Na acetate | 4 | Acrylyl. |
| Polyvinyl naphthalene | 15 | α-Cl-propionyl chloride | 3.2 | Na benzoate | 7 | Do. |
| Poly-α-Me styrene | 12 | β-Cl-α-Me propionyl chloride | 3.5 | Pyridine | 4 | α-Methacrylyl. |
| Polyvinyl toluene | 12 | α-Cl-butanoyl chloride | 3.5 | Tri-Me-amine | 3 | Crotonyl. |
| Poly-o-Cl styrene | 14 | β-Cl-α-phenyl propionyl chloride | 5 | Ca propionate | 5 | α-Phenyl acrylyl. |
| Polystyrene | 10 | α,β-Di-Cl propionyl chloride | 4 | Na tetraborate | 5 | Chloracrylyl. |
| Do | 10 | α-CN-β-Cl propionyl chloride | 3.8 | K acetate | 5 | α-CN acrylyl. |
| Do | 10 | p-(β-Cl-Et)-benzoyl chloride | 5 | ----do---- | 5 | p-vinyl benzoyl. |
| Do | 10 | 4-(β-Cl-Et)-naphthoyl chloride | 6.3 | Na acetate | 4 | 4-vinyl-1-naphthoyl. |
| Do | 10 | β-Br-propionyl bromide | 5.4 | K benzoate | 8 | Acrylyl. |
| Do | 10 | β-I-propionyl iodide | 7.7 | K acetate | 5 | Do. |
| Do | 10 | β-Cl-propionyl fluoride | 2.7 | ----do---- | 5 | Do. |

EXAMPLE VII

The procedure of Example VI is repeated a number of times with similar results using the combinations and proportions of copolymers and acyl halides shown in Table B. The numbers before each comonomer represent the amount of that comonomer in 100 parts of the indicated copolymer. In each case 2 molar parts of potassium acetate are used based on the amount of acylating agent originally used.

Table B

| Copolymer of— | Parts | Acylating agent | | Resultant vinyl keto group |
| --- | --- | --- | --- | --- |
| | | Type | Parts | |
| 70 styrene, 30 butadiene. | 12 | β-Cl-propionyl chloride. | 4 | Acryl. |
| 70 styrene, 30 ethylene. | 12 | α-Cl-propionyl chloride. | 4 | Do. |
| 60 vinyl toluene, 40 propylene. | 15 | β-Cl-α-Me-propionyl chloride. | 5 | α-Methacrylyl. |
| 75 styrene, 25 acrylonitrile. | 10 | β-Cl-α-phenyl propionyl chloride. | 6 | α-Phenyl acrylyl. |
| 75 Styrene, 25 vinyl cyclohexane. | 10 | p-(β-Cl-Et)-benzoyl chloride. | 6 | p-Vinyl benzoyl. |
| 90 styrene, 10 vinyl ethyl ether. | 8 | 4-(β-Cl-Et)-naphthoyl chloride. | 7 | 4-vinyl-1 naphthoyl. |

In addition to producing crosslinking by heating, the polymer products of this invention also can be crosslinked by various other methods including exposure to ultraviolet and ionizing radiation, as well as by reaction with amine compounds, such as piperidine, phenyl hydrazine, etc. Moreover, the products of this invention can be used for various purposes other than crosslinking and reacted in various other ways. For example, bromine can be added to the unsaturation of the vinyl keto groups so as to improve the fire retardant properties. The following examples illustrate some of these reactions.

EXAMPLE VIII 1.0 part of a vinylketo polymer prepared as in Example I and having 9 vinylketo groups per 100 benzene nuclei on a molar basis is dissolved in 5 parts of methylene chloride. To this is added 0.14 part of phenyl hydrazine in 0.5 part of anhydrous acetic acid and 1 part of methylene chloride. The mixture is refluxed for 2 hours, after which the reaction mixture is poured into methanol. Analysis of the resultant light yellow, fluorescent polymer shows 2.2% nitrogen which compares closely with the theoretical value of 2.16% for complete addition.

EXAMPLE IX

One part of the vinylketopolystyrene having a D.S. of 7.5 is dissolved in 100 parts of $CCl_4$. Then 2 parts of a 1% bromine in $CCl_4$ solution is added, and the mixture stirred for 3 hours. The resultant polymer product is precipitated by pouring the reaction mixture into methanol. The precipitaetd polymer is recprecipitated twice by dissolving in benzene and precipitating in methanol. Analysis shows 5.5% bromine as compared with a theoretical value of 5.7%.

EXAMPLE X

Two parts of the vinylketo polymer of Example I is dissolved in 10 parts of tetrahydrofurane. This solution is heated to 55° C. and 0.144 part of piperidine is added. After a reaction period of 1 hour, the reaction mass is poured into methanol to precipitate the product. This is reprecipitated from a mixture of methylene chloride and methanol to give product analyzing to 1.0% nitrogen as compared to a theoretical value of 1.08%.

Likewise, various radicals can be added to the unsaturated group of the vinylketo groups to impart dyeing properties or colors. Metal atoms can be incorporated also by addition of metal hydrides, etc. The vinyl keto polymers also can be incorporated in various drying oils, unsaturated polyester resins, plastisol formulations, polymerizable monomer compositions, etc., to hasten setting times and give improved products. For example, a 1.3% solution of a vinyl keto polymer having a D.S. of 2.0 in styrene monomer was completely gelled within an hour when heated at 60° C. with a small amount of azoisobutyronitrile. Heating styrene monomer under similar conditions without the vinyl keto polymer yielded a mobile solution containing less than 10% polymer.

The intermediate polymer product of this invention has a repeating unit structure represented by one of the formulas

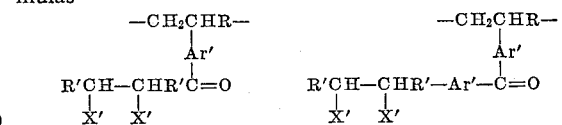

which are derived by the acylation step described herein. The repeating unit structure of the alkenyl aromatic starting polymer is

In these formulas R' and X' have the values indicated above; R represents hydrogen, methyl or ethyl; Ar represents an aromatic nucleus as illustrated above in the various illustrative compounds listed, preferably phenyl, naphthyl and diphenyl radicals and various derivatives thereof having at least four nuclear positions free for substitution; and Ar' represents aromatic nuclei similar to those defined for Ar except that it has one greater valency due to the substitution of the acyl group thereon.

Unless indicated otherwise the terms "polymer" and "polymeric," as used herein, include both homopolymers and heteropolymers.

Polymers having the preferred acrylyl substituent group thereon have a repeating unit structure of the formula

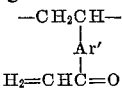

Likewise, when the preferred alkenyl aromatic polymers, e.g. polymers of styrene, are used as the starting polymer, the starting polymer and a substantial proportion of the intermediate as well as the ultimate polymers have the repeating unit structure of the formula

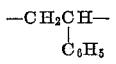

After acylation and dehydrohalogenation, this preferred polymer has a plurality of repeating unit structures of one of the formulas

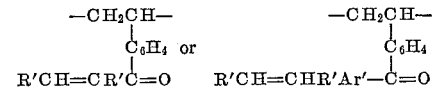

When polymeric styrene is converted to the ultimate preferred acrylyl derivative the resultant polymer has a plurality of repeating unit structures of the formula

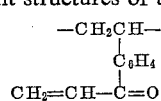

Other polymers prepared according to the above examples have, after acylation and dehydrohalogenation, a plurality of repeating units therein of the following formulas respectively in molar proportions corresponding to the degree of substitution:

(a) Examples I, II, III:

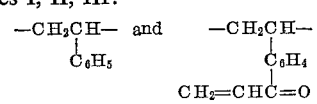

(b) Example IV:

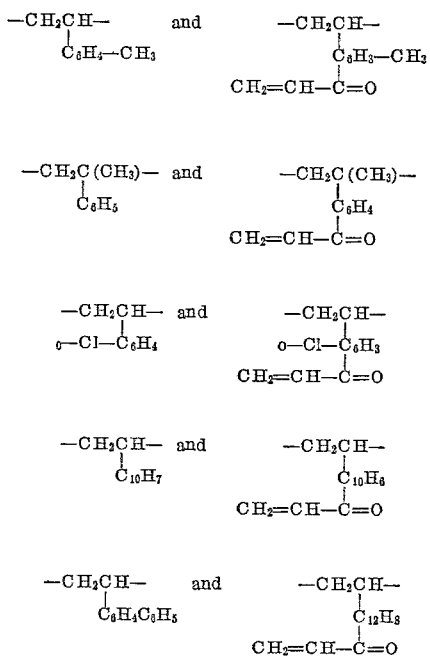

As indicated above, the vinyl keto polymers of this invention can be incorporated into drying oils, polyester (unsaturated) type resins, plastisol formulations, etc., to reduce greatly the time for setting and also to give improved products. They are also useful in the preparation of ion exchange resins.

One particularly valuable utility for the resins of this invention is in the preparation of casting resins wherein the vinyl keto polymer is used in place of the unsaturated polyester resin normally used for this purpose, such as derived from ethylene glycol and maleic anhydride, propylene glycol fumaryl phthalate, etc. With these unsaturated polyester resins, comonomers such as styrene and other monovinyl compounds are added to cause setting or crosslinking through the unsaturation in the polyester resin. The vinyl keto polymers of this invention have been found to be excellent replacements for the unsaturated polyester resins and also to give reduced setting times as well as improved properties in the resultant cast resins. As comonomers in this type of casting resin, the same type of monovinyl compounds can be used as are presently used with the unsaturated polyester resins. These are vinyl and vinylidene compounds defined as having $CH_2=CH-$ and $CH_2=C<$ groups respectively. Particularly preferred, however, are styrene and the various other vinyl aromatic compounds listed above as suitable for the preparation for the preformed polymer starting materials used in the practice of this invention. In addition, various other non-aromatic comonomers can be used such as vinyl acetate, vinyl chloride, vinylidene chloride, acrylonitrile, methyl methacrylate, methyl acrylate, etc.

The substitution of the vinyl keto polymers for the polyesters gives much more versatility in the nature of the resultant structure because both the degree of substitution and the polymeric backbone can be varied, and much higher molecular weights are possible. In addition, a much lower percentage of the vinyl keto polymer can be used to obtain equivalent physical properties. Improved heat distortion, inflammability, etc. are also obtained, in accordance with the type of vinyl keto polymer employed.

In producing such cast resins, the various types of catalysts presently used for such purposes can be employed, such as free radical-generating catalysts, e.g. peroxy and azo catalysts. Typical examples of these benzoyl peroxide, t-butyl hydroperoxide, t-butyl perbenzoate, lauroyl peroxide, di-t-butyl perphthalate, $\gamma',\gamma'$-azodiisobutyronitrile; dimethyl azodiisobutyrate, etc.

The following example illustrates a typical procedure for producing cast resins by this method, and also the excellent results obtained.

EXAMPLE XI

Two samples are prepared using six parts of styrene and four parts of a vinyl keto polystyrene prepared according to Example I, the first having a degree of substitution of 3.6 and a second degree of substitution of 10, with 0.5% of benzoyl peroxide added to each sample. Each sample is sealed under an inert atmosphere and heated at 80° C. for 2 hours. The conversion of monomer to polymer is complete and the resultant products have the physical properties listed in the table immediately below.

| D.S. | Flex strength (p.s.i.) | Flex modulus (p.s.i.×10⁵) | Heat distortion, ° C. | Izod, impact, lbs. | Ratio, Styrene/VKPS |
|---|---|---|---|---|---|
| 3.6 | 13,600 | 4.3 | 92 | 1.2 | 96.4/3.6 |
| 10.0 | 13,500 | 4.4 | 95 | 1.7 | 90/10 |

Similar improved results are obtained when vinyl toluene, chloro styrene, ethyl styrene, vinyl naphthalene, vinyl diphenyl, are substituted respectively for the styrene monomer. In some cases, such as with vinyl toluene and chloro styrene, the great polymerization tendencies of such compounds effect even faster setting of the casting resin than is the case with styrene.

Similar results are also obtained when various other polyalkenyl aromatic polymers of Examples II–VII having varying degrees of substitution of vinyl keto groups are substituted for the polymers used in Example XI.

The vinyl keto polymeric derivatives of this invention also undergo reaction by the addition of primary and secondary amines, mercaptans, primary and secondary alcohols, amino acids, etc., to the vinyl unsaturation. Postcuring can be effected by first reacting aminoalcohols and then subsequently curing through the pendant hydroxy groups by heating or further reaction. These polymers can also be crosslinked by reaction with related polyfunctional amines such as diamines as illustrated in the following example.

EXAMPLE XII

Varying amounts of piperazine are added to a 5% tetrahydrofurane solution of a vinyl keto polymer prepared as in Example II and having a D.S. of 7.3. After five minutes, viscosities are run on all solutions which have not gelled. Viscosities are measured as the time required for 4 ml. to run out of a graduated 5 ml. pipette.

The samples and viscosities are indicated in the table below.

| Sample | Composition | Viscosity (seconds), successive readings |
|---|---|---|
| 1 | Tetrahydrofurane | 6.4, 6.4 |
| 2 | 5% VKPS | 13.0, 13.3 |
| 3 | 5% VKPS+0.25 moles piperazine/mole vinylketo group | 15.0, 15.2 |
| 4 | 5% VKPS+0.50 moles piperzzine/mole vinylketo group | 15.6, 15.8 |
| 5[a] | 5% VKPS+0.75 moles piperazinen/mole vinylketo group | 60.0, 49.3 41.8, 40.8 |
| 6[a] | 5% VKPS+1.00 moles piperazine/mole vinylketo group | 98.9, 80.1 55.3, 47.9 |
| 7[b] | 5% VKPS+1.25 moles piperazine/mole vinylketo group | Gel |
| 8[b] | 5% VKPS+1.50 moles piperazine/mole vinylketo group | Gel |
| 9[b] | 5% VKPS+2.00 moles piperazine/mole vin lketo group | Gel |
| 10[b] | 5% VKPS+2.5. moles piperazine/mole vinylketo groupl | Gel |

[a] Solutions 5 and 6 are thioxotropic.
[b] Samples 7-10 show the ease of gel formation via this procedure.

Typical acylating agents which can be used in the practice of this invention include, but are not limited to: β-chloropropionyl chloride, β-chloropropionyl bromide, β-chloropropionyl fluoride, β-chloropropionyl iodide, α-chloropropionyl chloride, α-chloropropionyl bromide, α-bromopropionyl bromide, α-iodopropionyl iodide, α,α-dichloropropionyl chloride, α-methyl-α-chloropropionyl chloride, α-phenyl-β-chloropropionyl chloride, β-phenyl-α-chloropropionyl chloride, α-chloro-butanoyl chloride, p-(α-chloroethyl)-benzoyl chloride, p-(β-chloroethyl)-benzoyl chloride, (β-chloroethyl)-toloyl chloride, p-(β-chloro-α-methyl)-benzoyl chloride, (β-chloroethyl)naphthoyl chloride, p-(β-chloroethylphenyl)-benzoyl chloride, etc.

These are prepared easily from the corresponding acids by well known methods used in mawing acyl halides. For example, β-chloropropionyl acid can be reacted with benzoyl chloride or other high boiling acid chloride and the β-chloropropionyl chloride distilled from the reaction mass. The halogen substituted starting acid can also be prepared by well known methods. For example, according to one method acrylic, methacrylic, crotonic, cinnamic, β-chloracrylic, α-chloracrylic, β-cyano, α-cyano, vinyl benzoic, isopropenyl benzoic acids, etc., can be reacted with the appropriate hydrogen halide to give appropriate halide acid derivatives. Then these can be converted to the acyl halides as indicated above.

Vinyl keto groups that are represented by the above formulas and which can be substituted on the alkenyl aromatic polymers by the practice of this invention include, but are not restricted to: acrylyl, methacrylyl, crotonyl, α-chloracrylyl, β-chloracrylyl, cinnamyl, and α-phenylacrylyl groups.

Various acylating agents have been illustrated above. The Ar' nucleus given in one of the formulas for these agents can have substituted thereon in addition to the haloalkyl and the acyl radicals one or more of the groups described above as being suitably substituted on the Ar group of the preformed starting polymer, such as (β-Cl-ethyl)toluoyl chloride, 2-chloro-4-(β-Cl-ethyl)-bonzoyl chloride, 5-chloro-4-(β-Cl-ethyl)-1-naphthoyl chloride, 5-Me-4-(β-Cl-ethyl)-1-naphthoyl chloride, etc. However, unsubstituted phenyl and naphthyl groups are preferred.

In addition to the repeating unit structures illustrated above, the product derived in Example VI from poly-α-Me-styrene and having the α-methacrylyl group attached has repeating unit structures of the formulas:

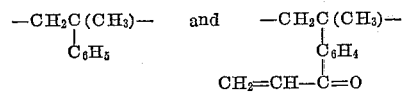

Likewise, the product derived in Example VI from poly-styrene and having the p-vinyl benzoyl group attached has repeating unit structures of the formulas:

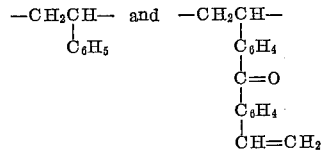

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:
1. The process of preparing a vinyl keto derivative of an alkenyl aromatic polymer comprising the steps of:
   (a) acylating a preformed polymer of an alkenyl aromatic compound of the formula

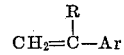

wherein R is a radical selected from the class consisting of hydrogen, methyl and ethyl radicals, Ar is an aromatic group selected from the class consisting of phenyl and naphthyl groups and the derivatives thereof in which each deriavtive group is selected from the class consisting of chloro, bromo, fluoro, cyano, alkyl, cycloalkyl and aryl groups, said alkyl, cycloalkyl and aryl derivative groups having no more than 8 carbon atoms, at least 5 percent by weight of said preformed polymer consisting of aromatic nuclei having at least 4 aromatic nuclear positions unsubstituted, with an acylating agent having a formula selected from the group consisting of

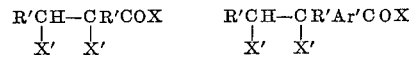

wherein each R' represents a radical selected from the class consisting of hydrogen, methyl, cyano and chloro radicals, at least one of which R' groups represent hydrogen, one X' is hydrogen and the other X' is a halogen selected from the class consisting of chlorine, bromine and iodine, Ar' is a divalent aromatic radical selected from the class consisting of phenylene, naphthylene and diphenylene radicals and derivatives thereof in which each derivative group is selected from the class consisting of chloro, bromo, fluoro, alkyl, cycloalkyl, and aryl groups, said alkyl, cycloalkyl and aryl derivative groups having no more than 8 carbon atoms therein, and X is a halogen atom, said acylation being effected in the presence of AlCl$_3$ until at least 0.01 molar equivalents and no more than 50 molar equivalents of said acylating agent have been attached to said aromatic nuclei per 100 aromatic nuclei in said preformed polymer; and
   (b) thereafter dehydrohalogenating the acyl group of the resultant acylated polymer in the presence of a hydrogen halide acceptor selected from the class consisting of alkali and alkaline earth metal salts of carboxylic acids and of weak inorganic acids, and tertiary amines, whereby said acyl groups are converted to vinyl keto groups.

2. The process of claim 1, in which said AlCl$_3$ is present in a molar proportion of at least 0.1 moles and no more than 1.5 moles per mole of said acylating agent.

3. The process of claim 1, in which said AlCl$_3$ is present in a proportion of approximately 1 mole per mole of said acylating agent.

4. The process of claim 1, in which said acylation is effected at a temperature no less than 0° C. and no higher than 80° C.

5. The process of claim 1, in which said acylation is effected at room temperature and ambient temperatures.

6. The process of claim 1, in which said dehydrohalogenation is effected at a temperature of at least 0° C. and no greater than 120° C.

7. The process of claim 1, in which said dehydrohalogenation is effected at a temperature of at least 0° C. and no greater than 65° C.

8. The process of claim 1, in which said dehydrohalogenation is effected in the presence of potassium acetate.

9. The process of claim 1, in which said dehydrohalogenation is effected in the presence of sodium acetate.

10. The process of claim 1, in which said dehydrohalogenation is effected in the presence of pyridine.

11. The process of claim 1, in which said dehydrohalogenation is effected in the presence of sodium bicarbonate.

12. The process of claim 1, in which said dehydrohalogenation is effected in the presence of sodium propionate.

13. The process of claim 1, in which said dehydrohalogenation is effected in the presence of trimethyl amine.

14. The process of claim 1, in which said acylating agent is β-chloropropionyl chloride.

15. The process of claim 1, in which said acylating agent is α-chloropropionyl chloride.

16. The process of claim 1, in which said acylating agent is β-chloro-α-methyl propionyl chloride.

17. The process of claim 1, in which said acylating agent is (β-chloroethyl)-benzoyl chloride.

18. The process of claim 1, in which said acylating agent is (α-chloroethyl)-benzoyl chloride.

19. A linear polymer having in the polymer chain thereof a plurality of aromatic repeating units having the formula

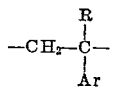

and also a plurality of vinyl keto repeating units having a formula

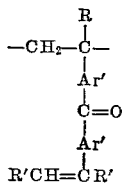

wherein R is a radical selected from the class consisting of hydrogen, methyl and ethyl radicals, Ar is an aromatic group selected from the class consisting of phenyl and naphthyl groups and the derivatives thereof in which each derivative group is selected from the class consisting of chloro, bromo, fluoro, cyano, alkyl, cycloalkyl and aryl groups, said alkyl, cycloalkyl and aryl derivative groups having no more than 8 carbon atoms, each R' represents a radical selected from the class consisting of hydrogen, methyl, cyano and chloro radicals, at least one of which R' groups represent hydrogen, and Ar' is a divalent aromatic radical selected from the class consisting of phenylene, naphthylene and diphenylene radicals and derivatives thereof in which each derivative group is selected from the class consisting of chloro, bromo, fluoro, alkyl, cycloalkyl, and aryl groups, said alkyl, cycloalkyl and aryl derivative groups having no more than 8 carbon atoms therein.

20. A polymeric composition of claim 19, in which said vinyl keto repeating units are present in a molar equivalent proportion of at least 0.01 and no more than 50 on the basis of each 100 aromatic nuclei in said polymer.

21. A polymeric composition of claim 19 in which said vinyl keto repeating units have the formula

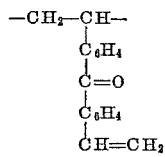

22. A polymeric composition of claim 19 in which said aromatic repeating units have the formula

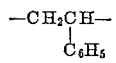

23. A polymeric composition of claim 19 in which said aromatic repeating units have the formula

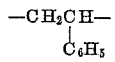

and said vinyl keto repeating unit has the formula

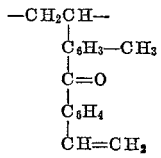

References Cited by the Examiner

UNITED STATES PATENTS

| | | | |
|---|---|---|---|
| 2,137,664 | 11/1938 | Bayer et al. | 260—592 |
| 2,500,082 | 3/1950 | Lieber et al. | 260—23 |
| 2,566,302 | 9/1951 | Allen et al. | 260—63 |
| 2,708,665 | 5/1955 | Unruh | 260—23.5 |
| 2,713,570 | 7/1955 | Kenyon et al. | 260—63 |
| 2,716,097 | 8/1955 | Unruh et al. | 260—47 |
| 2,716,102 | 8/1955 | Unruh et al. | 260—63 |

OTHER REFERENCES

Thomas: Anhydrous Aluminum Chloride in Organic Chemistry, A.C.S. Monograph Series #87, Reinhold Pub. Co., N.Y. (1941), pp. 228–230.

Wagner and Zook Synthetic Organic Chemistry, John Wiley & Sons, N.Y. (1953), pp. 35–38 and 317–323 (particularly pp. 37–38 and 320 relied on).

WILLIAM H. SHORT, *Primary Examiner.*

JAMES A. SEIDLECK, *Examiner.*